April 17, 1962  G. H. LOVINS  3,029,666
MEANS FOR PRESSURE-VIBRATION JOINING OF METAL
Filed May 1, 1957
FIG. 1
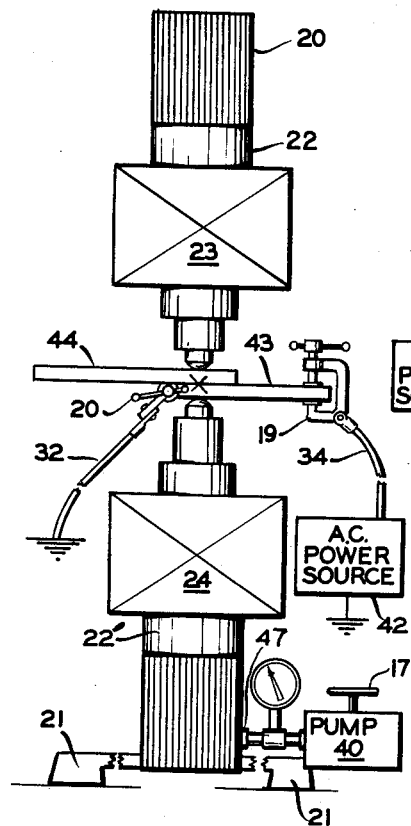
FIG. 2
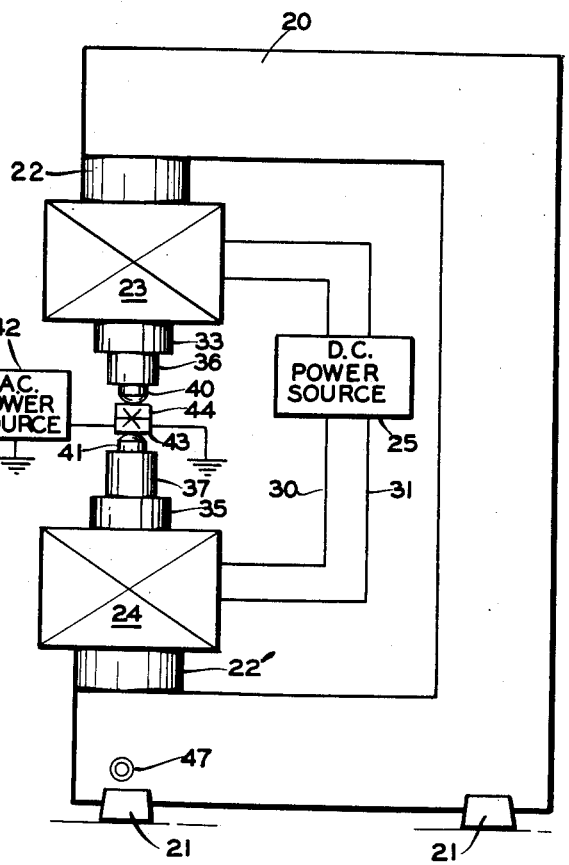
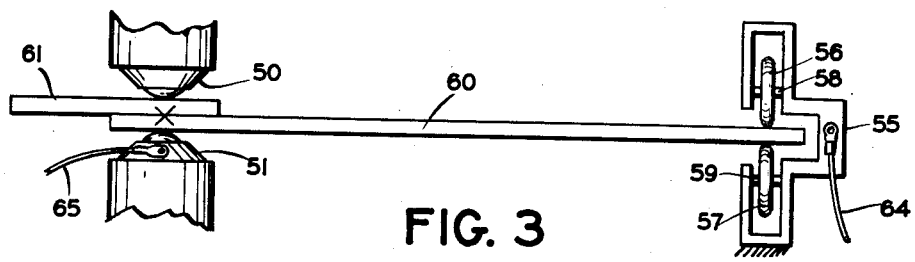
FIG. 3
INVENTOR.
GERALD H. LOVINS
BY
ATTORNEY

United States Patent Office 3,029,666
Patented Apr. 17, 1962

3,029,666
MEANS FOR PRESSURE-VIBRATION
JOINING OF METAL
Gerald H. Lovins, Upper Montclair, N.J., assignor to Curtiss-Wright Corporation, a corporation of Delaware
Filed May 1, 1957, Ser. No. 656,305
4 Claims. (Cl. 78—82)

This invention relates to a method and means of joining materials by employing vibratory energy and pressure.

Heretofore, the uniting or joining of materials such as metal has been accomplished in general by welding, wherein heat was essential. Many metals in common use today will not withstand high temperatures. For example, aluminum, copper and many alloys are united, but high temperature in uniting the metals is not always permissive. Consequently, it is desirable to have a new method for uniting certain metals, and it is an object of the present invention to provide novel method and means for uniting metals.

A further object of the invention is to provide novel method and means for uniting pieces of metal, one of which has sufficient electrical conductance to permit adequate magnetic interaction for uniting said pieces of metal in accordance with the teachings of the invention.

A further object is the provision of novel method and means of combining materials, one of which is a conductor, so that a magnetic field may be established thereabout by passing a current through said conductor and supplying a second magnetic field intersecting the first magnetic field and applying pressure to the materials to be joined in the area of both of said magnetic fields.

The present invention contemplates a method and apparatus for joining two pieces of materials, at least one of which is a fairly good conductor of electricity. The two pieces to be joined are pressed together in the desired area. Electricity, let us say alternating current, is passed through that portion of one of the work pieces where it is desired to be joined to another work piece, so that a magnetic field may be set up or established in the area to be joined. A second magnetic field may be established by permanent magnets or by magnets energized, let us say, by direct current. The magnetic field established by the direct current intersects the magnetic field established by the alternating current passing through the work piece. The interaction of the magnetic fields established by the alternating current and the direct current will cause vibratory motion, of at least one of the work pieces, at the pressure area of the pieces to be united.

The foregoing and other objects and advantages of the invention will appear more fully hereinafter from a consideration of the detailed description which follows, taken together with the accompanying sheet of drawing, wherein several embodiments of the invention are illustrated by way of example. It is to be expressly understood, however, that the drawing is for the purpose of illustration and description only and is not intended as a definition of the limits of the invention.

In the drawings:

FIG. 1 is a front view of one form of the invention.

FIG. 2 is a side view of the presentation shown in FIG. 1, with the pressure gage and pump removed.

FIG. 3 is a partial end view of a modification of the invention which may be used for continuous uniting of materials or seam welding.

A possible theory of so-called cold welding indicates that if pressure is applied in the area of the parts to be joined and the parts are vibrated relative to each other, the surface films will be broken and the metals will be united, since the opposed surfaces will be forced into intimate contact with each other before they had a chance to reoxidize. Welding, in general, follows this same basic theory of (1) removal of oxidized or other film, and (2) forcing the nascent materials into intimate contact before re-formation of the oxide surface coating. In the present invention the joining process can be conducted without the specific addition of heat at the joint and at relatively low pressure in the joint area.

Referring to the drawings, there is shown a supporting structure 20 having legs 21 disposed adjacent the four corners of the lower portion of the supporting structure for holding same in an upright position. While the supporting structure may be any means for holding the various parts of the equipment in the desired operating positions, the present device has a C-shaped member of laminated material forming a magnetic yoke. The end portions of the magnetic yoke terminate in upper and lower cylindrical stubs 22 and 22', respectively, and have coils 23 and 24 positioned thereon. A direct current power source 25 is connected by conductors 30 and 31 to the coils 23 and 24 for supplying a magnetic field for the apparatus. Upper and lower cylinders 33 and 35 may be made of any suitable magnetic material and are adapted to receive upper and lower pistons 36 and 37, respectively, with at least one of said pistons being movable.

A pump 40' is connected to the coupling 47 for supplying pressure to at least cylinder 35, and 33 where desired, so that the piston 37, and 36 if desired, may be actuated so that there may be relative movement therebetween, resulting in movement of the upper and lower pressure tools 40 and 41. An alternating current power source 42 is shown connected, by conventional symbol, to ground and to the lower work piece 43 at one side or end thereof, while the opposite side or end thereof is connected to ground shown by conventional symbol.

The upper work piece 44 is positioned on top of and contiguous with the work piece 43, and an X indicates the center of the general pressure area of the two work pieces provided by the pressure of the pressure tools 40 and 41. The pressure tools, the pistons, and the cylinders may be made of magnetizable material, as are the upper and lower cylindrical stubs 22 and 22' for providing suitable flux paths for the direct current initiated magnetic field which interacts with the alternating current initiated magnetic field. When the coils 23 and 24 are energized by the direct current source 25, a magnetic path will be formed through the magnetic yoke and ultimately across the pressure tools 40 and 41, thereby flowing through the work pieces 44 and 43, and being concentrated in the area X, which is the center of the pressure area provided by the particular shape of the pressure tool ends and the hydraulic or other fluid pump 40.

In FIG. 1 there are shown conductors 32 and 34, which are connected to work piece 43 by way of clamps 20 and 19, which clamps represent a convenient means of connecting the power source 42 to the work piece.

A valve control 17 is shown connected to the pump 40 for controlling the pressure which may be applied to one or both of the pressure tools. While a hand valve is shown, it is to be understood that any suitable valve may be used, which valve may be foot-operated or even automatic, and may be operated by electrical circuit and controls.

In actual practice, electrical apparatus may be employed, wherein after the work pieces are properly set up within the device, manipulation of a control will apply the pressure to the pressure tools. Upon attaining a certain predetermined pressure, relay means may be energized to apply the direct current or alternating current, or both, simultaneously to the device, depending on the arrangement of the complemental circuitry.

In FIG. 3 there are shown pressure tools 50 and 51, which may include ball bearings or other forms of movable pressure tool ends, carried in any suitable structure such as that shown in FIGS. 1 and 2. The tool ends may be of magnetizable material. However, any tool arrangement may be utilized so that flux may flow under proper operating conditions to provide the desired interaction for vibratory motion of the desired portions of the work pieces.

The FIG. 3 device shows an arrangement for continuous welds, or seam welding of two pieces of material. A roller support 55 may be secured to the supporting structure of the pressure tools 50 and 51, or may be supported in any suitable manner depending upon the particular operation to be performed, which may be determined by the size of the work piece. Rollers 56 and 57 are pivotally mounted at 58 and 59, respectively, in the roller support 55, so that the work piece 60, along with the work piece 61, may be moved during the joining or cold welding operation.

The rollers and the roller support 55 may be metallic. However, any suitable means may be used to provide electrical continuity, so that current may flow through suitable means such as conductors 64 and 65, when said conductors are connected to a source of energy such as 42 or 25, depending on the particular operation.

In FIG. 3, pressure tools 50 and 51 would ordinarily be termini for a flux path therebetween when connected in a suitable manner such as that set forth in relation to FIGS. 1 and 2 for producing interacting fluxes or magnetic fields.

While FIGS. 1 and 2 show a source of alternating current being connected to one of the work pieces and show a direct current power source connected to supply a magnetic field between the pressure tools, it is to be understood that alternating current power may be connected to the coils such as 23 and 24 and direct current may be connected to flow through the work piece. However, the present showing of specific arrangements and other means for supplying magnetic fields may be utilized. Any means for producing magnetic fields may be employed so long as there is provided magnetic fields which interact to provide vibratory motion at the faces of the work pieces to be joined or cold welded.

From the foregoing it will be seen that interaction of the magnetic fields will provide a vibratory motion of the interfaces of the work pieces. The interaction of the magnetic fields will produce a motor action, so that there will be relative vibration of the work piece interfaces. While the alternating current power source may be of any suitable frequency, which includes the sonic range, it is to be understood that energy of ultrasonic frequency may be utilized.

The present arrangement shows the clamps 19 and 20 connected to the work piece 43 so that the current will flow therethrough, including the area of the joint to be formed. It is to be understood that the clamp 20 may be secured to the right of the X shown in FIG. 1, so that the current flow would not be through the area X. However, it is to be understood that ordinarily there would be some current flow through work piece 43, which would produce a suitable magnetic field for interaction with the second magnetic field to produce the desired vibratory motion. One magnetic field is shown emanating from the upper and lower pressure tools, but the field need not necessarily emanate from the pressure tools, per se, but may emanate from a source spaced therefrom. Any suitable source of magnetic field may be employed for suitable interaction with that produced about the work piece 43. Any suitable sources of magnetic field may be utilized in any manner provided there is the necessary interaction therebetween to produce resultant vibratory motion of at least one of the work pieces for interfacial friction of the work pieces in the area of the joint to be formed.

While the work pieces may be of any material such as aluminum, copper, or alloys which may be relatively soft, it is to be understood that any materials, metallic or otherwise, may be used provided vibratory action is produced therebetween at the interfacial surface of the joint to be made.

Two modifications of the invention concern alternate configurations for interacting the magnetic fields. In both of these the magnetic fields are separated from the pressure clamp holding the work pieces in intimate contact. One modification employs a separate conductor for the current, this conductor being removably attached to or clamped to one work piece by a vise or clamp, the whole assembly being disposed in the other magnetic field and adjacent the pressure clamp on the joining area. The second modification is similar to the first modification, but the current is passed through part of the work piece in the magnetic fields, and the vise and separate conductor are not required.

Joinng or cold welding of metals has been referred to herein, but it is to be understood that other materials may be joined provided some form of vibrational energy is supplied which may result from having one work piece being a conductor of electricity.

Although several embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed is:

1. Apparatus for cold joining metal members which comprises a C shaped magnetic yoke; movable, magnetic and oppositely disposed clamping jaws secured to the ends of said C shaped magnetic yoke, said clamping jaws for holding said members together under pressure in the area to be joined; hydraulic means for moving one of said clamping jaws with respect to the other whereby the areas of said members to be joined are held together under varying degrees of pressure; electrical coils around the end of said C shaped magnetic yoke; a source of D.C. power connected to said electrical coils for the energization thereof, said coils creating upon energization thereof a first magnetic field between said clamping jaws, one of said clamping jaws becoming a North magnetic pole and one a South magnetic pole, said magnetic field passing through said members in the area to be joined and between said North and South magnetic poles; and means for passing an alternating current through one of said members along a dimension including the area to be joined, thereby creating a second magnetic field therearound, the flux lines of said second magnetic field interacting with the flux lines in said first magnetic field to vibrate said clamped metal members to be joined whereby the surface films on the interfaces between said members in the areas to be joined are broken and the opposing surfaces of said members at said interface are joined.

2. Apparatus for producing a continuous cold weld along a length of said members as defined in claim 1 in which said clamping jaws are roller bearings for providing a rolling contact under pressure between said clamping jaws and said metal members when said metal members are moved relative thereto.

3. Apparatus as defined in claim 2 in which said alternating current circuit through said energized member is completed through one of said clamping jaws.

4. Apparatus as defined in claim 3 including rollers for supporting said energized member, said alternating electrical circuit through said energized member being completed through said rollers.

(References on following page)

References Cited in the file of this patent

UNITED STATES PATENTS

| | | |
|---|---|---|
| 837,277 | Birkeland et al. | Dec. 4, 1906 |
| 1,183,264 | Woodrow | May 16, 1916 |
| 2,021,477 | Bohn | Nov. 19, 1935 |
| 2,173,450 | Larsen et al. | Sept. 19, 1939 |
| 2,238,053 | Hart | Apr. 15, 1941 |
| 2,651,148 | Carwile | Sept. 8, 1953 |
| 2,819,916 | Bartels et al. | Jan. 14, 1958 |
| 2,834,158 | Petermann | May 13, 1958 |
| 2,946,119 | Jones et al. | July 26, 1960 |

FOREIGN PATENTS

| | | |
|---|---|---|
| 1,087,439 | France | Feb. 23, 1955 |
| 1,087,440 | France | Feb. 23, 1955 |